US009246674B2

(12) United States Patent
Brainis et al.

(10) Patent No.: US 9,246,674 B2
(45) Date of Patent: Jan. 26, 2016

(54) GENERATION OF CRYPTOGRAPHIC KEYS

(75) Inventors: Edouard Brainis, Brussels (BE); Juilen Niset, Brussels (BE); Louis-Philippe Lamoureux, Brussels (BE)

(73) Assignee: Universite Libre De Bruxelles, Brussels (BE)

( * ) Notice: Subject to any disclaimer, the term of this patent is extended or adjusted under 35 U.S.C. 154(b) by 196 days.

(21) Appl. No.: 14/127,016

(22) PCT Filed: Jun. 15, 2012

(86) PCT No.: PCT/EP2012/061508
§ 371 (c)(1),
(2), (4) Date: Apr. 16, 2014

(87) PCT Pub. No.: WO2012/172080
PCT Pub. Date: Dec. 20, 2012

(65) Prior Publication Data
US 2014/0219443 A1    Aug. 7, 2014

(30) Foreign Application Priority Data

Jun. 17, 2011   (GB) .................................. 1110290.2

(51) Int. Cl.
H04L 9/08    (2006.01)

(52) U.S. Cl.
CPC ............ H04L 9/0816 (2013.01); H04L 9/0852 (2013.01); H04L 9/0861 (2013.01); *H04L 2209/24* (2013.01)

(58) Field of Classification Search
CPC ............................ H04L 9/0852; H04L 9/0861
USPC .......................................................... 380/46
See application file for complete search history.

(56) References Cited

U.S. PATENT DOCUMENTS

| | | | | |
|---|---|---|---|---|
| 5,428,686 A * | 6/1995 | Brown | .................. | H04L 9/0656 380/44 |
| 2006/0039558 A1* | 2/2006 | Morii | ..................... | G06F 7/582 380/46 |
| 2007/0263861 A1* | 11/2007 | Kiyomoto | ............. | H04L 9/0668 380/46 |
| 2012/0008772 A1* | 1/2012 | Sugahara | ................ | G06F 21/79 380/46 |
| 2012/0039474 A1* | 2/2012 | Ho | ........................ | H04L 9/3242 380/278 |
| 2012/0045053 A1* | 2/2012 | Qi | ........................... | G06F 7/588 380/252 |
| 2012/0177201 A1* | 7/2012 | Ayling | .................. | H04L 9/0858 380/278 |
| 2013/0201316 A1* | 8/2013 | Binder | .................... | H04L 67/12 348/77 |
| 2014/0016776 A1* | 1/2014 | Van Foreest | ............ | G06F 21/72 380/46 |
| 2014/0222881 A1* | 8/2014 | Pirvu | .................. | G07F 17/3223 708/255 |
| 2015/0055778 A1* | 2/2015 | Cox | ........................ | H04L 9/0662 380/46 |

OTHER PUBLICATIONS

Menezes et al., hereinafter ("Menezes"), Handbook of Applied Cryptography (CRC Press), Chapter 5: Pseudorandom Bits and Sequences, pp. 174-175 and Chapter 13: Key Management Techniques, pp. 546-547.*

* cited by examiner

*Primary Examiner* — Hadi Armouche
*Assistant Examiner* — Sakinah Taylor
(74) *Attorney, Agent, or Firm* — BrainwoodHuang

(57) ABSTRACT

A method is provided of generating and distributing secret random data. The method requires a plurality of participating parties each to own an identical private-key generation device and to request a random signal over a shared publication communication network. At each iteration of the method, the parties process the public random signal with the internal states of their secret-key generation devices using two functions, the output of the first function being generated secret random data and the output of the second function being a new internal state.

15 Claims, 4 Drawing Sheets

GENERATION OF CRYPTOGRAPHIC KEYS

FIELD OF THE INVENTION

The present invention relates to the generation of private keys for encrypting messages.

BACKGROUND OF THE INVENTION

Transmission networks using the RSA public-key algorithm (for example as disclosed in U.S. Pat. No. 4,405,829) have been in use throughout the world for more than 10 years. RSA is the first algorithm known to be suitable for signing as well as encryption, and was one of the first great advances in public key cryptography. In particular, the RSA algorithm is one of the building block of the Transport Layer Security (TLS) protocol that provides security for communication systems (such as media players, laptop computers, smartphones and servers) over networks like the Internet. More precisely, the RSA algorithm provides the required security necessary to exchange a secret key between separated parties. This exchanged key can ultimately be used in a symmetric cipher (e.g. AES, 3DES, etc) for encrypted communication.

The RSA algorithm is based on the assumption that factoring large numbers is difficult and is believed to be secure given sufficiently long private/public key pairs and the use of up-to-date implementations. Similar public key algorithms are based on other difficulties such as the discrete log problem, i.e. DSA (U.S. Pat. No. 5,231,668) and Diffie-Hellman (U.S. Pat. No. 4,200,770) while others, i.e. Elliptic Curve Cryptography (e.g. U.S. Pat. No. 6,563,928), are based on the intractability of finding the discrete logarithm of an elliptic curve element. However, it is possible that algorithms faster than those currently available for factoring large numbers (or finding discrete logarithms) will be discovered. Other methods to break certain implementations of public key algorithms have also been discovered. For example, recent experiments (Pelligrini A. et al, "Fault-based attack of RSA authentication" 2010 Proceedings of the Conference on Design, Automation and Test in Europe) have demonstrated the ability to crack RSA's 1024 bit private key, using a hardware attack, in less than 100 hours and without leaving a single trace.

Quantum key distribution (QKD) is an alternative to public key distribution to exchange secret keys between authorized parties. QKD is based on the idea that key bits are encoded in quantum systems (e.g. single photons) and exchanged between the parties. An important and unique property of QKD is the ability of the two communicating users to detect the presence of any third party trying to gain knowledge of the key. This results from a fundamental aspect of quantum mechanics: the process of measuring a quantum system in general disturbs the system. A third party trying to eavesdrop on the key must in some way measure it, thus introducing detectable anomalies. In contrast to traditional public key distribution protocols that rely on mathematical hypotheses, QKD elegantly relies on the laws of nature being correct. The most practical implementation of QKD today implies sending weak photon pulses in optical fibres (see e.g., U.S. Pat. No. 6,438,234 and U.S. Pat. No. 7,403,623). However, since it requires information to travel on passive optical channels, its implementation on regenerative and mixed opto-electronical transmission networks such as the Internet is impossible. Furthermore the private-key generation rate is limited by optical attenuation on optical fibres for which no practical solution is currently available. Also, serious flaws of commercial QKD implementations have been demonstrated rendering the systems completely vulnerable to eavesdropping (Lydersen L. et. al., "Hacking commercial quantum cryptography systems by tailored bright illumination", Nature Photonics, Vol. 4, PP. 686-689 (2010)).

New trends in network data processing, especially cloud computing, video delivery, and multi-party communications, impose new constraints in terms of the computational resources required to achieve the security levels which are deemed acceptable to prevent unlawful breaches. These new trends will require high-rate key-distribution methods that are not only secure but also scalable.

Since none of the previous protocols enable high-rate secret-key distribution, modern cryptography relies on symmetric cipher algorithms (such as AES, 3DES, etc) that use keys which are much shorter than the plain-text message. They are not information-theoretically secure.

SUMMARY OF THE INVENTION

According to an aspect of the present invention, there is provided a method of generating secret-keys at a user station comprising:
  receiving a random bit stream at the user station;
  processing a vector of the random bit stream with an internal state according to a first function to generate a first secret key;
  processing the vector of the random bit stream with the internal state according to a second function to generate an updated internal state;
  processing another vector of the random bit stream with the updated internal state to generate a new secret key.

A further aspect of the invention provides a user station comprising:
  means for receiving a random bit stream;
  means for storing an internal state;
  a first function for processing vectors of the random bit stream with the internal state stored in the storing means to generate secret keys;
  a second function for processing vectors of the random bit stream with the internal state stored in the storing means to generate an updated internal state, which replaces the internal state of the storing means for generating subsequent secret keys.

The invention is useful in the context where there is a community of user stations as defined above, wherein each user station in the community shares a common secret of the internal state. In this way, secret keys can be commonly simultaneously generated at each user station of the community.

As an alternative, each user station can have a unique internal state which allows for the generation of private random data for cryptographic protocols. Private random data is an essential ingredient of many cryptographic protocols in use today. Internet protocols such as SSL/TLS or IPSec, which are used to secure the communication channel between a client computer and a server, depend on the existence of such private random data on both sides of the channel. The adoption of new technologies such as cloud computing and virtualization are imposing new constraints on the servers of datacenters. In particular, private random data is becoming a scarce resource in modern datacenters and this method could be used to, e.g., distribute independent and private random data to the servers of a datacenter.

Another aspect of the invention provides a computer program product comprising program code means which when executed by a processor at a user station implement the steps of the above-defined method.

For a better understanding of the present invention and to show how the same may be carried into effect, reference will now be made by way of example to the accompanying drawings.

DESCRIPTION OF THE PREFERRED EMBODIMENTS

Figure 1:
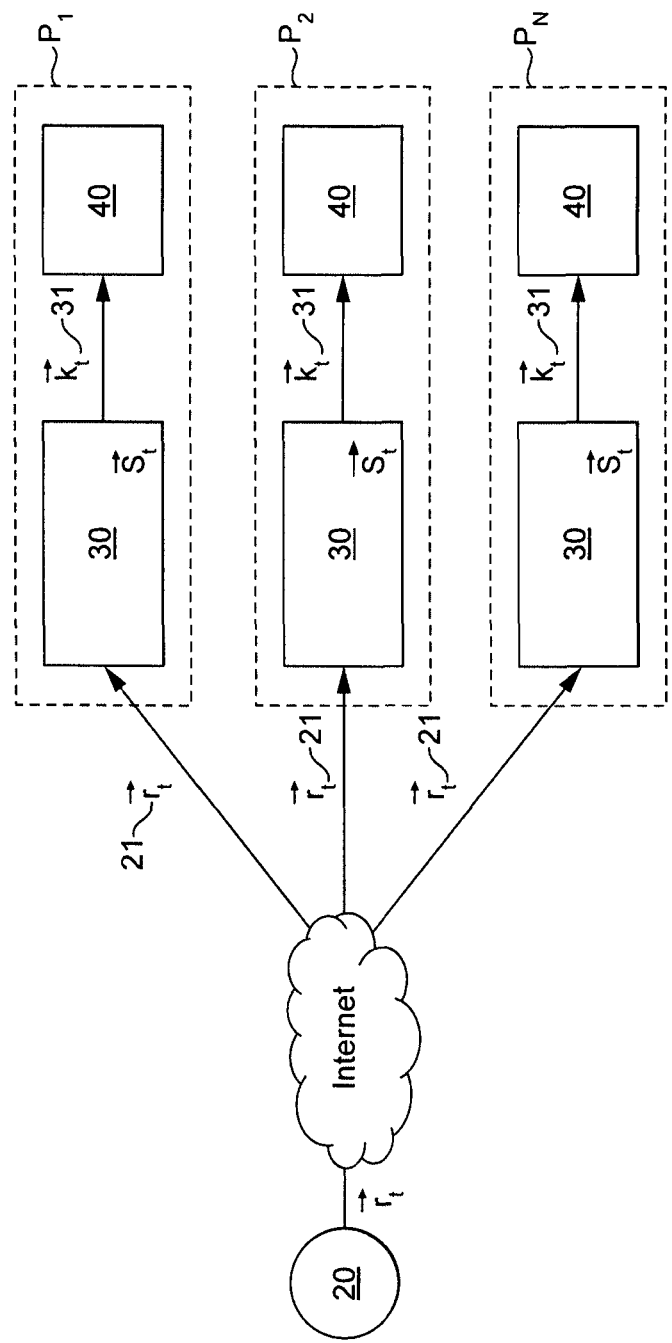
FIG. 1 is a general diagram representing a secret key distribution method for N=3 participating parties, based on the present invention.

Before discussing the embodiments of the present invention, some cryptographic background will be set out. According to cryptographic theory, an ideal encryption/decryption protocol was theorized in 1917, known as the one-time pad. This provides in theory proven unconditional security and relies on the exclusive or (XOR) of each bit of a message with a corresponding bit of a key. To provide the necessary security requirements, the key must be truly unpredictable and must be as long as the message. To date this has not been commercially implemented because of technological limitations.

In contrast, another piece of research focused on showing that asymptotic security can be achieved even with a short secret key provided that a sufficiently large amount of public random data be available to the communicating parties. This is discussed by Maurer in his paper "Conditionally perfect secrecy and approvable secure randomised cipher" in the Journal of Cryptography 5: 53-56 (1992). While the theory is sound, in practice Maurer's randomised cipher suffers from an impractical ratio between the required public random data and the size of the plain text message.

The embodiments of the present invention presented below illustrate a key distribution protocol which are based on the restrictions of a potential hacker's memory capacity, and computing power. By combining these ideas, and making use of a recent new development in the field of high rate true random number generators, some of Maurer's constraints can be relaxed, thus providing a fast and scalable secret key generation scheme that is suitable for demanding multi-user's applications.

The following described embodiments of the present invention provide a novel method to generate and distribute secret random data. In summary, the method requires that N participating parties own an identical secret-key generation device and request an identical ultra-high-rate, unpredictable, random signal over a shared public communication network. The method works iteratively. At each iteration, the parties process the public random signal with the internal states of their secret-key generation devices using two publicly known, highly nonlinear functions with strong confusion and diffusion properties. The output of the first function is the generated secret random data, while the output of the second function is the new internal state of the secret-key generation device.

In a first embodiment, the present invention provides a key distribution method. Unlike the RSA or Diffie-Hellman public-key distribution methods that only rely on computational limitations, the present method also relies on one's inability to store a vast amount of information. This is an improvement over existing protocols and it could be introduced as a replacement for communications demanding high security. The presently described key-distribution method provides participating parties with a vast amount of shared secret random data to be used as secret keys for cryptographic purposes and is well suited for groups containing a fixed number of parties. The number of parties can be arbitrarily large and has no effect on the generation rate of the shared secret randomness. This important feature renders the method scalable.

The key distribution method starts with an "initialization" phase. First the N parties exchange a shared common secret referred to as the "master key". The master key takes the form of a bit-string of fixed length. This initial exchange of the master key can be implemented with any secure key establishment technique. Next, the participating parties initialize the internal state of their secret-key generation device using all or part of the master key. When only part of the master key is used to initialize the internal state of the secret-key generation device, the remaining part can be used to, e.g., provide authentication or message integrity over the shared public communication network. The initialization phase is preferably performed only once and can be used to generate an arbitrarily large number of secret keys as long as the number of parties remains constant. If a new party enters or a current party leaves the secret sharing group, the key-distribution method should preferably be reinitialized.

Following initialization is the subsequent "key generation" phase of the present key-distribution method. This phase works iteratively. The N encrypting parties request an identical ultra-high-rate, unpredictable, random signal over the public communication network. In a preferred embodiment, this random signal is a stream of random bits. Each party then process this public random signal with the internal state of his/her secret-key generation device using first and second functions. The functions are publicly known, highly nonlinear functions with strong confusion and diffusion properties. The output of the first function is the generated common secret key, while the output of the second function is the new internal state of the secret-key generation device. The new internal state is then used to generate a next secret key by applying the first function to a subsequent received portion of the random signal and the new internal state. Provided that the N participating parties have initialized their secret-key generation device with the same master key, the presently described key generation phase can generate arbitrary large amount of common secret keys.

In a second embodiment, the initialization phase is slightly modified such that the participating parties initialize the internal state of their secret-key generation device with independent and private secrets. Thus, no shared common master key needs to be established. The subsequent key generation phase works identically. However, since the secret-key generation device of each party was initialized with an independent and private secret, each party will generate independent and private random data. Accordingly, the present invention also provides a method to distribute independent and private random data over a public channel. This method for distributing random data is compatible with groups containing an undefined number of parties and is therefore suitable to distribute private random data over a public network such as the Internet.

To implement embodiments of the invention with high security depends upon two properties of the public random signal. First, the public random signal must be unpredictable, and second it must be of ultra-high rate. New designs of high-bandwidth physical true random number generators (TRNG), e.g. as described in PCT/EP2010/061320, fulfill both requirements. Together with the correct choice of first and second functions, these two properties guarantee that an eavesdropper cannot gain information on the initial state of the private-key generation devices of the parties, nor the subsequently generated secret keys or random data.

The present invention bears similarities with "key derivation" (e.g. as specified in NIST Special Publication 800-108) since secret keys are generated from an initial shared master key. However it differs from that class of algorithms by the fact that the internal state of the secret-key generation device changes in time. The present invention also differs from "key derivation" by the vast entropy input to the secret-key generation device received from the public random bit stream.

In the first embodiment, the present invention allows N spatially separated authorized parties to generate shared secret keys from an identical ultra-high-rate, unpredictable, random bit-stream distributed over a public communication network. The generated secret keys can be subsequently used for cryptographic purposes with, e.g., private-key ciphering algorithms such as AES or the information theoretically secure one-time-pad.

FIG. 1 shows a representation of such a shared communication network for N=3. Each party P1, P2 . . . PN can be located at a specially separate user terminal. Each authorized party P1, P2 . . . PN in the network owns an identical secret-key-generation device 30 that receives a random-bit stream 21 from an ultra-fast TRNG 20. The random bit stream 21 can be considered to constitute a sequence of random bit vectors $r_t$. There is no restriction on the physical location of the TRNG 20. In alternative but equivalent embodiments, the TRNG is owned by one of the parties or stand alone. The TRNG 20 is connected to each secret-key-generation device by a public channel, such as the Internet, meaning that it can be monitored by a potential eavesdropper. The device 30 works iteratively. The period of one iteration is derived from the random-bit vector $r_t$ of predefined length [r] which also serves as a clock. At each new time-step t, starting with the initial time step t=0, the public random-bit vector $r_t$ is injected in device 30 and combined with its internal state $s_t$ of length [s] to output a random and secret bit sequence 31 represented by the binary vector $k_t$ of length [k]. Depending on the cryptographic needs, the random sequence 31 can either be directly used as a shared secret key or feed a register 40 that serves as a random-bit reservoir for subsequent production of longer secret keys.

Figure 2:
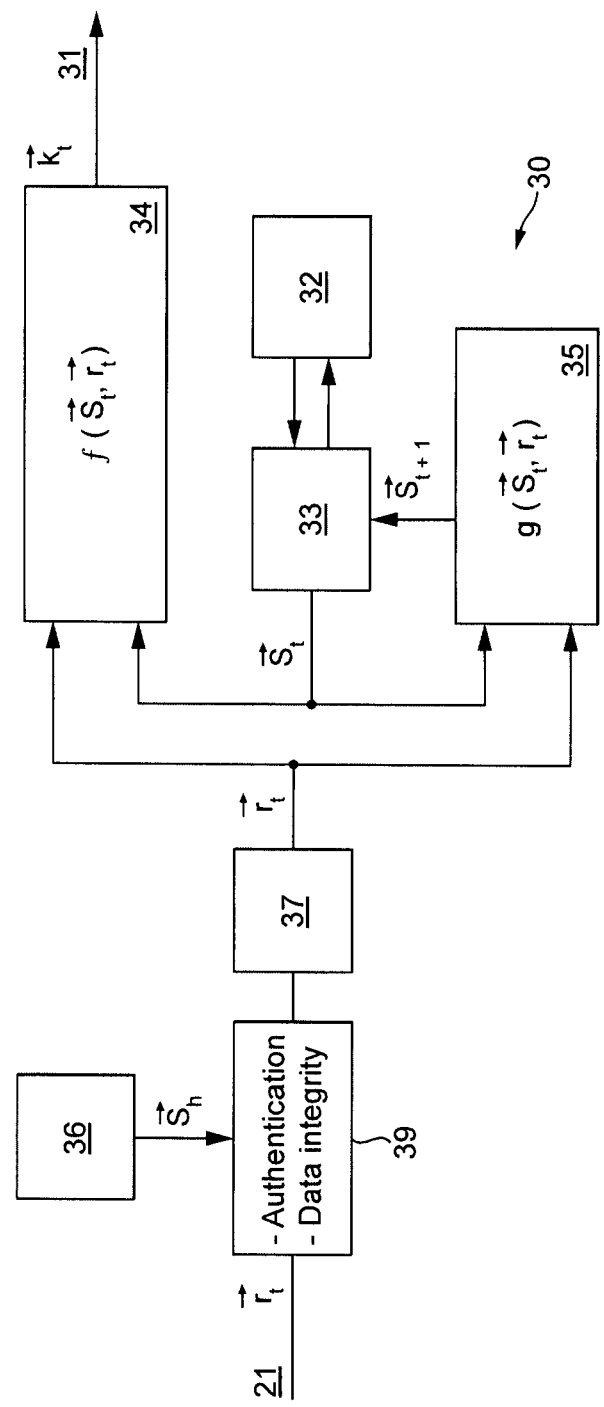
FIG. 2 is a diagram representing the local operations performed by each participating party for a secret key distribution method based on the present invention.

FIG. 2 shows a representation of the structure of the algorithm that is implemented inside each secret-key-generation device 30. FIG. 2 is shown in block form for ease of reference. It will readily be appreciated that the algorithm can be implemented by hardware, software or firmware or any suitable combination thereof. It is expected that the most likely implementation of the algorithm would be by a code sequence held in memory and executed on a processor at each participating party P1 . . . PN. The algorithm first requires the exchange of a shared common secret referred as the "master key" between the N participating parties. The master key is the combination of binary vectors $s_0$ of length [s] and $s_h$, of arbitrary length. The vector $s_0$ is used to initialize the internal state vector $s_t$ of the secret-key-generation device 30, and is therefore copied to memory block 33 which holds the current instant of the internal state. The current instance of $s_t$ is stored in memory block 33. The binary vector $s_h$ (36 in FIG. 2) can be used to verify both the authenticity and the data integrity of the public random bit-stream 21 with e.g. Message Authentication Code (MAC) or Hash-based Message Authentication Code (HMAC). After verification the random input vector $r_t$ is stored in register 37. From time to time, a copy of the internal state $s_t$ is saved in the memory block 32. This state can be subsequently used as a new $s_0$ for reinitializing the system if, e.g., one of the participating party lost synchronization with the others.

Subsequent to this initialization the key-generation starts. At each time step t, the random bit vector $r_t$ and internal state vector $s_t$ are processed by function modules 34 and 35 implementing the functions $k_t=f(s_t,r_t)$ and $s_{t+1}=g(s_t,r_t)$. The functions $f(s_t,r_t)$ and $g(s_t,r_t)$ are public and used to generate the shared key $k_t$ and update the internal state of the secret-key-generation device, respectively. At the next time step, the next random bit vector is processed with the updated internal state, to generate a new secret key. This takes place in a synchronized fashion at each of the participating parties such that any time step t they are each generating the same new secret key, and same updated internal state. Although described herein as key distribution, the method can more accurately be considered as simultaneous generation of common (shared) secret keys by multiple participating parties.

The security level and execution speed of the presently described key-distribution method highly depends on the properties of the functions $f$ and g. It is the objective of the following paragraphs to briefly discuss some of these properties and their choice for a preferred embodiment.

The purpose of first function $f(s_t,r_t)$ is to generate the random bit vector to act as secret key $k_t=f(s_t,r_t)$ by mixing the current values of the public random bit vector $r_t$ and secret internal state vector $s_t$ in such a way that the resulting key $k_t$ is both random and secret. The purpose of the second function $g(s_t,r_t)$ is to update the internal state vector $s_{t+1}=g(s_t,r_t)$ of the secret-key-generation device 30. In a preferred embodiment, both functions are chosen to be balanced (such that all possible outputs $k_t$ are equiprobable and the internal state $s_t$ is unbiased) and fast to compute (to take advantage of the speed of the true random number generator). To insure the privacy of the internal state $s_t$ under plain text attacks and the backtracking resistance (i.e. the property that if the internal state $s_t$ at time-step t is ever discovered, the private sequences $k_T$ generated at previous time-steps T<t cannot be deduced), both functions should also be hard to invert.

An important feature of the present invention is the fact that the output $k_t$ at some time-step t depends not only on the current random vector $r_t$ but also on all its previous values, and the initial shared secret $s_0$ according to the relation 1:

$$k_t=f(s_t,r_t)=f(g(s_{t-1},r_{t-1}),r_t)=f(g(g(s_{t-2},r_{t-2}),r_{t-1}),r_t)=\ldots=f(g(g(\ldots g(s_0 r_0),\ldots),r_{t-2},r_{t-1}),r_t) \quad (1)$$

A malicious eavesdropper having access to part or all of some private sequences $k_T$ generated at previous time-steps T<t may wish to exploit the deterministic nature of Eq. (1) to reveal the internal value $s_{T_0}$ of device 30 at an earlier time-step $T_0$. Eq. (1) shows that he may do so by solving a set of [s] binary nonlinear equations for [s] binary variables. To make such an algebraic attack ineffective, the functions $f$ and g must be chosen so that the resulting system has the highest possible non linearity where non linearity is defined as the Hamming distance between the considered function and the closest linear one. With a proper choice of functions $f$ and g, the time required for an eavesdropper to reverse engineer the device 30 would imply to simultaneously record and store an impracticable amount of random data from the TRNG. In a preferred embodiment, $f$ and g are provably secure cryptographic hash functions such as those specified in SHA-2 (see NIST FIPS PUB 180-2 publication).

The properties of the present invention also depend upon the chosen sizes of the vectors s, r and k. In particular, to avoid brute force attacks, the condition |s|>>|k| must be satisfied. If function f is chosen to be a HMAC based on SHA-256, as defined in RFC 2104, then a preferred choice of vector sizes is |s|=512, |r|=256, and |k|=256.

Figure 2A:
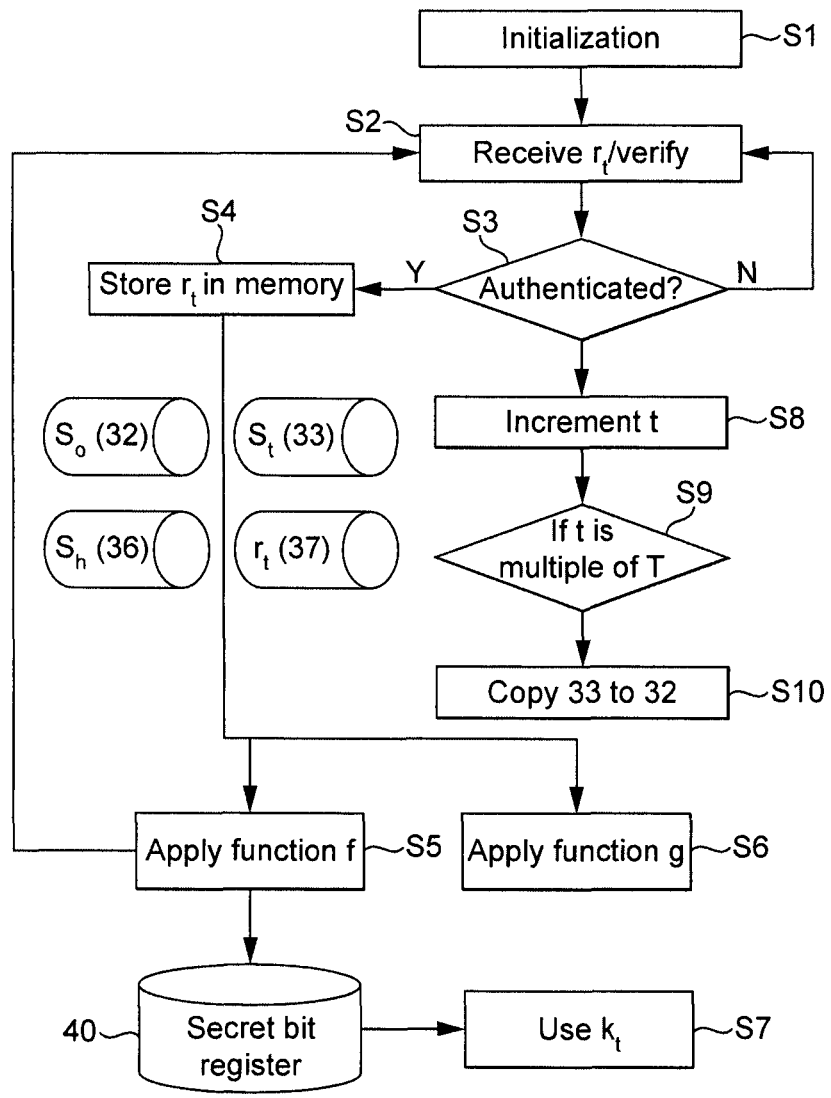
FIG. 2A is a flow chart of a key distribution method.

FIG. 2a is a flow chart illustrating the main steps of the method.

The method comprises an initialization step S1 wherein a master key is shared. In initialization step the following takes place: receive the master key $[s_0 s_h]$; initialize the state vector by storing $s_0$ into the memory block (33) and store the string $s_h$ into the memory block (36); initialize a time counter t to zero. In the subsequent key generation stage, the random stream (21) is received from the true random number generator (20). Its authenticity and data integrity is verified using $s_h$. This carried out in step S2.

Step S3 denotes the step of confirming if the random bit vector is authenticated. If not, it is returned to the verify step of S2. If it confirmed, it is stored in the memory (37) (S4).

The state of the memory blocks is shown diagrammatically below step S4 in FIG. 2a at this point.

Step S5 illustrates that function F is applied on the contents of memories (33 and 37) $s_t$ and $r_t$ packets to computer a new secret-key vector $k_t$ (31) and place it in a secret bit register (40). The secret bit register can be used for cryptography (step S7).

Step S6 denotes that function G is applied on the contents of memory (37) and (33) ($s_t$ and $r_t$) to renew the state vector $s_t$ and store it back into memory (33).

FIG. 2a also illustrates a periodic update feature in steps S8, S9 and S10. According to step S8 the time counter t is incremented. Step S9 determines if t is a multiple of t and, if so, copies the contents of memory 33 to memory 32.

Figure 3:
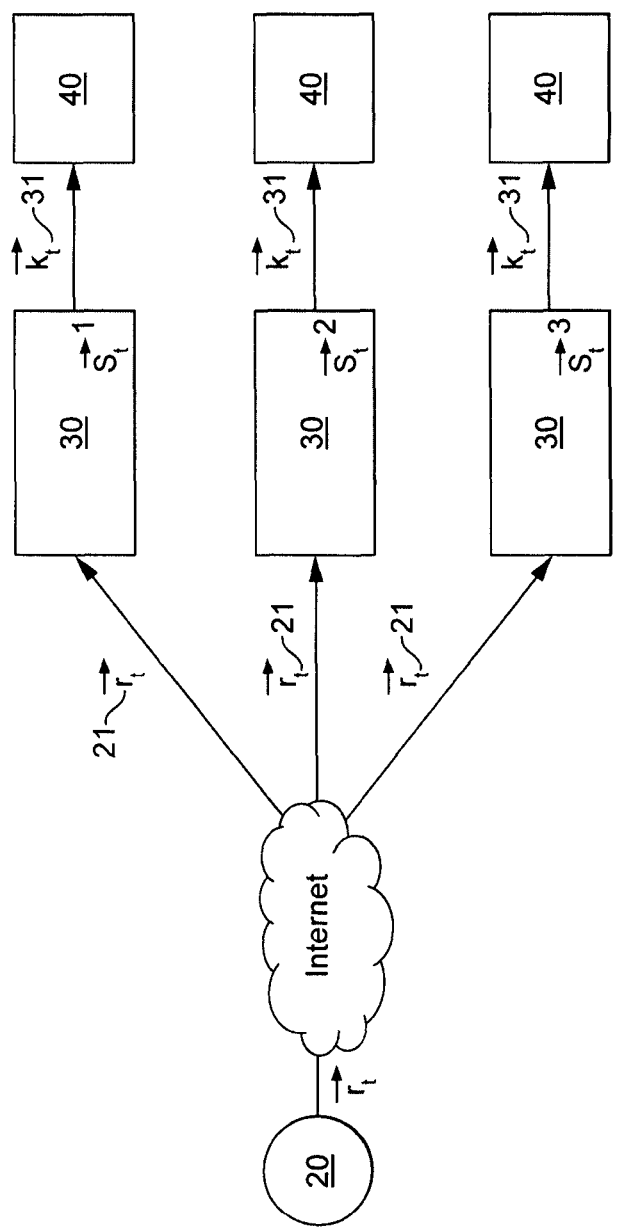
FIG. 3 is a general diagram representing a private random-data derivation method for N=3 independent parties, based on the present invention.

A second embodiment is illustrated in FIG. 3. It is identical to the first embodiment with the exception that the participating parties initialize the internal state of their secret-key generation device with independent and private secrets ($s_0^i$, i=1, 2, ...). Since the secret-key generation device of each party was initialized with an independent and private secret, each party will generate independent and private true random data without the need for a local true random number generator.

By combining the technology of a true random number generator as described for example in PCT/EP2010/061320 which can provide true random numbers based on unpredictable quantum fluctuations at a very high speed, for example 4 GB per second with distribution of a random stream, shared secret keys can be simultaneously generated (i.e. distributed) at very high speed, for example around 4 GB per second.

Moreover, as there is no restriction on the length of the key, one-time pad cryptography can be applied to messages at very high rates, for example 4 GB per second.

The first embodiment described above thus provides a key distribution method which uses the following components:
  a true random number generator;
  a network capable of transporting generated random numbers;
  a plurality of authorised stations capable of receiving and processing generated random numbers;
  and a common secret shared by the authorised stations, wherein the security simultaneously relies on an eavesdropper's computational memory restrictions.

In particular, eavesdropping requires to memorise the generated random numbers in order to guess the value of the shared secret keys and/or the value of the common secret. The random number generation rate is preferably so high that the amount of random data to be recorded renders eavesdropping intractable.

The second embodiment of the present invention provides a private random number derivation method using the following components:
  a true random number generator;
  a network capable of transporting generated random numbers;
  independent stations capable of receiving and processing generated random numbers and owning an independent and private secret;
  wherein the privacy of the resulting derived private data relies on a eavesdropper's computational and memory restrictions.

In particular, eavesdropping requires to memorise the generated random numbers in order to guess the value of the independent secret of a given independent station and/or the private random data derived by a given independent station. The random number generation rate is preferably so high that the amount of random data to be recorded renders eavesdropping intractable.

While preferred embodiments of the present invention have been described and disclosed, it will be recognized with those with skills in the art, that modifications are within the true spirit and scope of the invention. The appended claims are intended to cover all such modifications.

The invention claimed is:

1. A method of secure communication wherein common secret keys are generated at a plurality of participating user stations comprising:
  receiving at each of the participating user stations a common public random bit stream from a random number generator;
  at each user station, processing a vector of the random bit stream with an internal state according to a first secure cryptographic hash function to generate a first secret key wherein the participating user stations share a common secret as said internal state;
  processing the vector of the random bit stream with the internal state according to a second secure cryptographic hash function distinct from the first secure cryptographic hash function to generate an updated internal state;
  processing another vector of the random bit stream with the updated internal state to generate a new secret key, whereby each of the participating user stations generate the same first and new secret key and same updated internal state, and the number of participating stations has no effect on the generation rate of common secret keys; and
  using the secret keys in secure communication exchange between the plurality of participating user stations.

2. A method according to claim 1, wherein the participating user stations exchange a master key to act as the common secret in an initialization phase.

3. A method according to claim 1, comprising the step of generating the random bit stream using a true random number generator.

4. A method according to claim 1, comprising the step of generating the random bit stream using a quantum random number generator.

5. A method according to claim 1, wherein the random bit stream is received at a rate of 4 GB per second.

6. A method according to claim 1, wherein the random bit stream is received at each of the participating user stations from a common random number generator.

7. A method according to claim 1, wherein the participating user stations are physically spatially separated and connected by a public network.

8. A method according to claim 1, comprising the step of encrypting a message having a bit length equal to that of the secret key, the encryption step comprising processing each bit of the message with a corresponding bit of the secret key.

9. A computer program product comprising a non-transitory computer-readable medium having computer program instructions recorded thereon which when executed by a processor at a user station cause the user station to perform a method of secure communication wherein common secret keys are generated at a plurality of participating user stations, the method comprising:

receiving a common public random bit stream from a random number generator;

processing a vector of the random bit stream with an internal state according to a first secure cryptographic hash function to generate a first secret key wherein the user station shares a common secret with the other participating user stations in the plurality of participating user stations as said internal state;

processing the vector of the random bit stream with the internal state according to a second secure cryptographic hash function distinct from the first secure cryptographic hash function to generate an updated internal state;

processing another vector of the random bit stream with the updated internal state to generate a new secret key, whereby the user station generates the same first and new secret key and same updated internal state as the other participating user stations, and the number of participating stations has no effect on the generation rate of common secrete keys; and using the secret keys in secure communication exchange between the user station and the other participating user stations.

10. A method according to claim 1, wherein the time (Ti) taken to invert the first and second secure cryptographic hash functions, and the rate (R) of the random bit stream are related such that storing (R*Ti) bits exceeds available data storage capacity and makes the protocol secure.

11. A method according to claim 1, that allows to establish an arbitrarily large amount of private keys to authorized user stations.

12. A user station for use in a plurality of participating user stations connected via a public network comprising a memory and a processor which is configured to execute code to implement the steps of:

exchanging a master key to act as a common secret with other participating user stations;

receiving a common public random bit stream from a random number generator;

storing in the memory the common secret as an internal state;

processing a vector of the random bit stream with the internal state stored in the memory according to a first secure cryptographic hash function to generate a first secret key;

processing the vector of the random bit stream with the internal state stored in the memory according to a second secure cryptographic hash function distinct from the first secure cryptographic hash function to generate an updated internal state;

processing another vector of the random bit stream with the updated internal state to generate a new secret key, whereby the user station generates the same first and new secret key and same updated internal state, as the other participating user stations, and the number of participating stations has no effect on the generation rate of common secret keys; and using the secret keys in secure communication exchange between the user station and the other participating user stations.

13. A community of user stations according to claim 12, wherein each participating user station in the community shares the common secret as the internal state.

14. A user station according to claim 12, comprising encryption means for encrypting a message having a bit length equal to that of the secret key, the encryption means comprising means for processing each bit of the message with a corresponding bit of the secret key.

15. A user station according to claim 12, which operates such that R×Ti (wherein R is the rate of the random bit stream and Ti is the time taken to invert the first and secure cryptographic hash functions) exceeds available data storage capacity.

* * * * *